United States Patent [19]

Rawlins

[11] Patent Number: 5,336,418
[45] Date of Patent: Aug. 9, 1994

[54] FUEL TANK CLEANING SYSTEM AND METHOD OF REDUCING CONTAMINANTS IN FUEL

[76] Inventor: P. J. Thomas Rawlins, 216 Sena Dr., Metairie, La. 70005

[21] Appl. No.: 970,552

[22] Filed: Nov. 3, 1992

[51] Int. Cl.$^5$ .......................................... B01D 17/02
[52] U.S. Cl. ................................ 210/799; 210/750; 210/805; 210/800
[58] Field of Search .............. 210/805, 258, 195.1, 210/799, 800, 265, 257.1, 305, 241, 790, 167; 208/402

[56] References Cited

U.S. PATENT DOCUMENTS

| | | | |
|---|---|---|---|
| 404,425 | 6/1889 | Obenchain . | |
| 938,495 | 11/1909 | Lunstrum . | |
| 2,846,710 | 8/1958 | Haika | 15/345 |
| 2,986,279 | 5/1961 | Henigman | 210/800 |
| 3,171,807 | 3/1965 | Neuman | 210/319 |
| 3,900,397 | 8/1975 | Bell | 210/128 |
| 4,135,946 | 1/1979 | Casey et al. | 210/199 |
| 4,153,553 | 5/1979 | Davis | 210/241 |
| 4,360,436 | 11/1982 | Poveromo | 210/241 |
| 4,772,401 | 9/1988 | Rawlins | 210/788 |
| 4,840,732 | 6/1989 | Rawlins | 210/306 |
| 5,078,901 | 1/1992 | Sparrow | 210/800 |
| 5,174,892 | 12/1992 | Davis | 210/257.1 |

FOREIGN PATENT DOCUMENTS

| | | | |
|---|---|---|---|
| 3904364 | 8/1990 | Netherlands | 210/800 |
| 1701644 | 12/1991 | U.S.S.R. | 210/800 |

*Primary Examiner*—Robert A. Dawson
*Assistant Examiner*—Ana Fortuna
*Attorney, Agent, or Firm*—Pravel, Hewitt, Kimball & Krieger

[57] ABSTRACT

A system for cleaning contaminated fuel in a fuel tank by introducing a suction line to substantially the lowermost part of the tank for suctioning off free water and heavy contaminants settled in the tank. The materials are then routed via suction to a first strainer, where free water and contaminants are trapped and retrieved. The filtrate then moves to a separation vessel, whereby the fuel is filtered through a primary filter medium, and the contaminants settle to the bottom of the vessel and are collected. The filtered fuel is then routed to a tertiary filter before being returned to the fuel tank to agitate the contaminants and facilitate this removal by the suction side of the system. This closed loop process is continued until the filtered fuel is substantially free of contaminants.

2 Claims, 4 Drawing Sheets

FUEL TANK CLEANING SYSTEM AND METHOD OF REDUCING CONTAMINANTS IN FUEL

BACKGROUND OF THE INVENTION

1. Field of the Invention:

The present invention relates to fuel tanks and cleaning of fuel tanks. More particularly, the present invention relates to an improved system for cleaning a fuel tank of a vessel, such as a ship, and the method of undertaking the cleaning process by using a series of cleaning vessels in the system.

2. General Background:

The present inventor has obtained two patents in this field which cover, generally, a method of cleaning contaminated fuel in a vessel's fuel tank, or in a storage tank. U.S. Pat. No. 4,772,401, granted on Sept. 20, 1988, entitled "Method of Reducing Contaminants in a Fuel Tank" disclosed a system for undertaking the above process, with claims addressing the method of filtering fuel contained in a tank by suctioning fuel from the tank, circulating the fuel through a filter, removing the contaminants out of the filtrate, and returning the fuel to the fuel tank through an inlet so that the fuel remaining is stirred up for further removal. The second patent, U.S. Pat. No. 4,840,732, a divisional of the '401 patent, claimed the vessel for separating the solid contaminants and free water from contaminate fuel, through the use of a tank containing baffles positioned so that the free water and contaminants which settled from the fuel could be drained off from the vessel, and discharged, while the remaining fuel underwent the filtration process.

This particular application addresses and discloses improvements in the patented system, and provides a more improved system, which is novel in the current state of the art. Other pertinent art known by the applicant will be disclosed in the prior art statement filed in the case.

SUMMARY OF THE PRESENT INVENTION

What is provided is a system for cleaning contaminated fuel in a fuel tank by introducing a suction line to substantially the lowermost part of the tank for suctioning off free water and heavy contaminants settled in the tank. The materials are then routed via suction to a first strainer, where free water and contaminants are trapped and retrieved. The filtrate then moves to a separation vessel, whereby the fuel is filtered through a primary filter medium, and the contaminants settle to the bottom of the vessel and are collected. The filtered fuel is then routed to a tertiary filter before being returned to the fuel tank. The filtered fuel is discharged at the bottom of the tank at high velocity to stir up contaminants and facilitate their removal by the suction side of the system. This closed loop process is continued until the filtered fuel is substantially free of contaminants.

A second embodiment provides a gravity centripetal separator vessel wherein the contaminated fuel is pumped into a substantially cylindrical vessel, the heavy contaminants and water in the fuel settle to the bottom of the vessel, and the lighter, cleaner fuel is removed from the upper portion of the vessel, passing through a filter medium within the vessel. Samples of the contaminants and water are routed to a first transparent vessel where one may visually view the contaminated fuel in the vessel, until the fuel becomes relatively clean. The fuel leaving the separator vessel following filtration goes to a secondary filter, and then a sample of it is routed to a second transparent vessel for viewing for non-contamination before being returned to the tank. The operation of the drain valves on the first transparent vessel as described elsewhere herein enable the contaminants in the separator tank to be further concentrated. The contaminants and water which are viewed and concentrated in the first vessel are collected in a sludge tank for disposal.

In either embodiment, to assure the initial suctioning off of free water and heavy contaminants a modified suction pipe is inserted into the tank initially, prior to the suction/return line used in the system.

Therefore, it is a principal object of the present invention to provide an improved filter system for fuel whereby the fuel, following separation and primary filtration is monitored for decontamination during the filtration process;

It is a further object of the present invention to concentrate the contaminants in the first transparent vessel to minimize the quantity of waste;

It is a further object of the present invention to provide an improved fuel cleaning system, which provides a means to visually monitor the level of contaminants in the fuel for further filtration, if necessary; and It is a further object of the present invention to provide a fuel cleaning system which utilizes a filtration means whereby free water and contaminants are removed subsequent to the primary filtering steps in the process.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
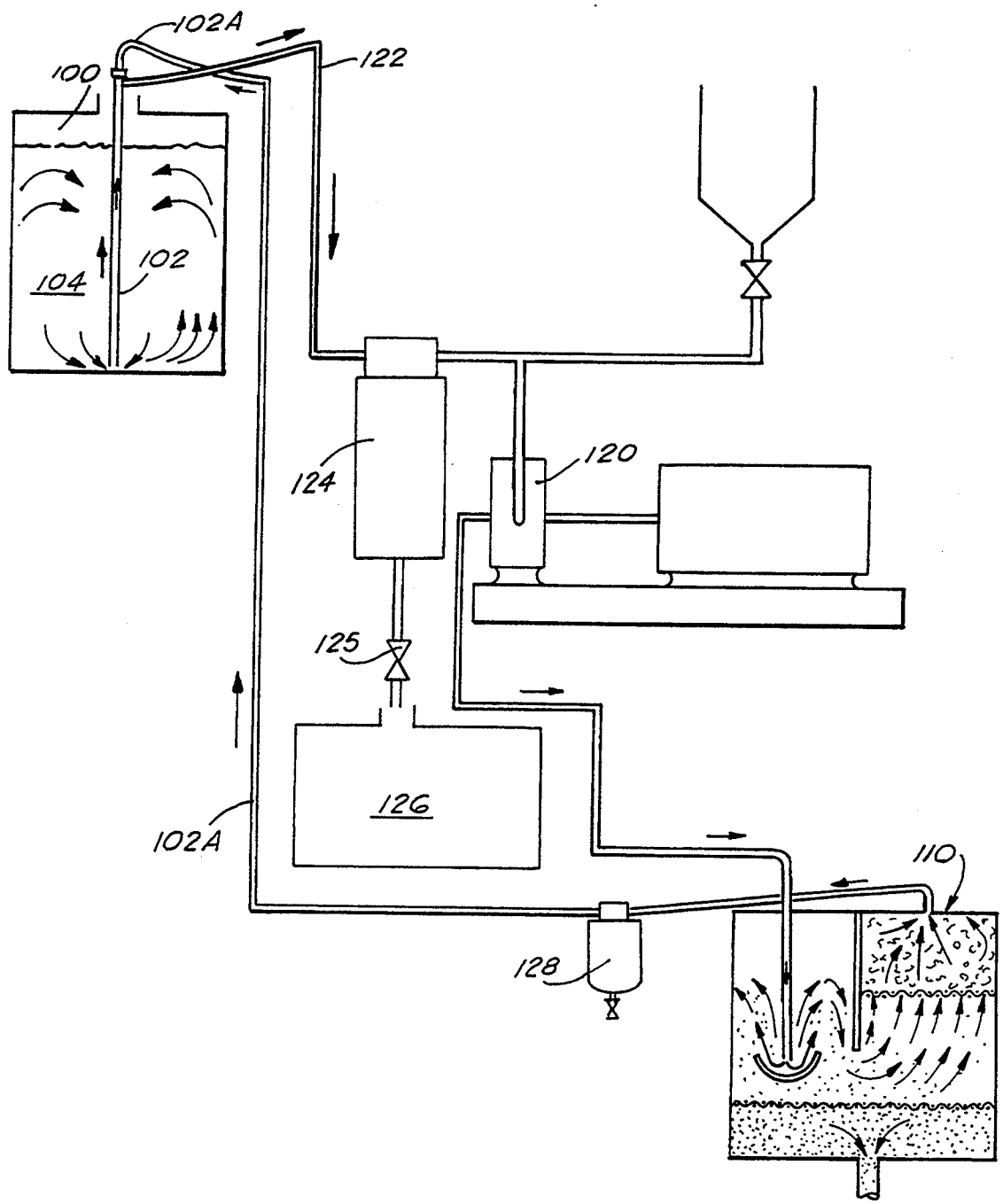
FIG. 1 illustrates an overall view of a first embodiment of the improved filtration system of the present invention.
Figure 2:
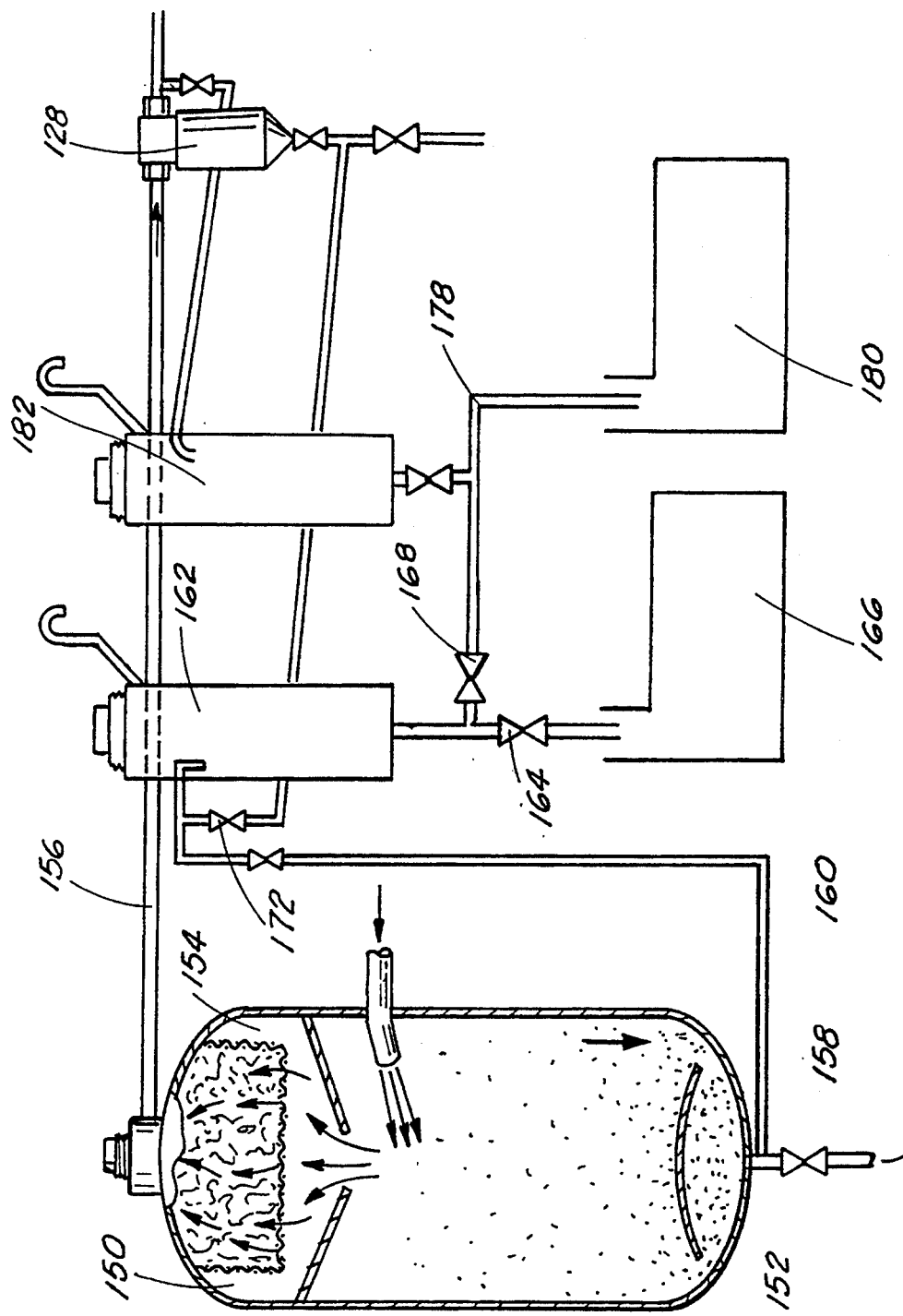
FIG. 2 illustrates an overall view of a second embodiment of the improved filtration system of the present invention.
Figure 3A:
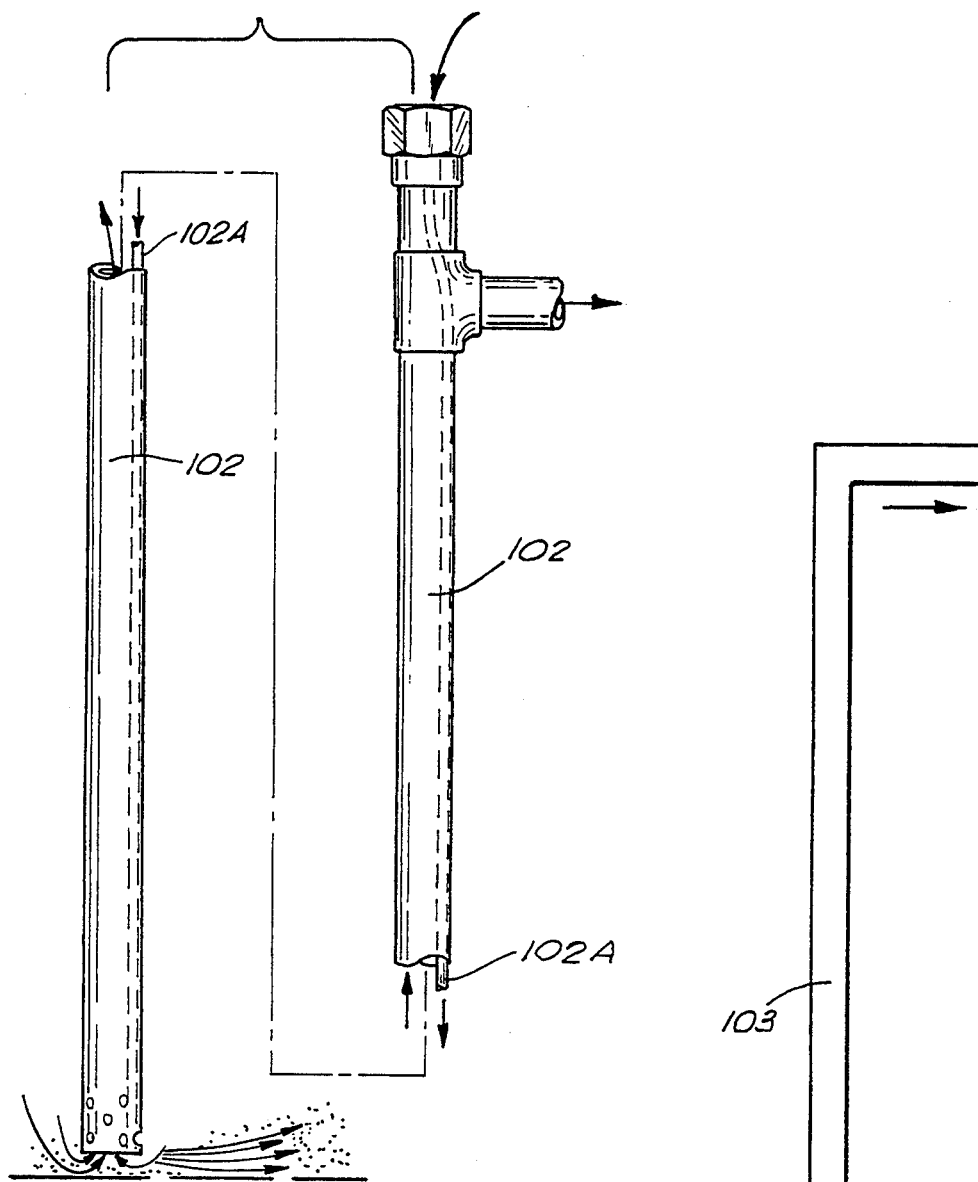
FIG. 3A illustrates an isolated view of the suction/discharge line portion of the improved system of the present invention.

FIGS. 1 through 3 illustrate the preferred embodiments of the improved contaminated fuel filtration system of the present invention by the numeral 10. However, prior to a discussion of the present invention, reference is made to FIG. 4 which discloses, in general the patented system, disclosed in the inventor's prior U.S. Pat. Nos., 4,772,401 and 4,840,732, where there is illustrated a fuel tank 100 containing contaminated fuel, a suction/return line 102 is lowered into the tank, and suctions fuel 104 from the tank through line 106, by pump 108. The fuel is then routed to a first principal filtration/separator vessel 110, having a means to separate the fuel, so that the contaminants flow to the bottom of the vessel, and are decanted from the vessel, and the lighter, cleaner fuel, flows through a filtration medium 112, such as steel wool, and is then routed to a secondary filter 114, and returned and reintroduced into the tank. This process continues until the fuel has been decontaminated over a give period of time.

Figure 3B:
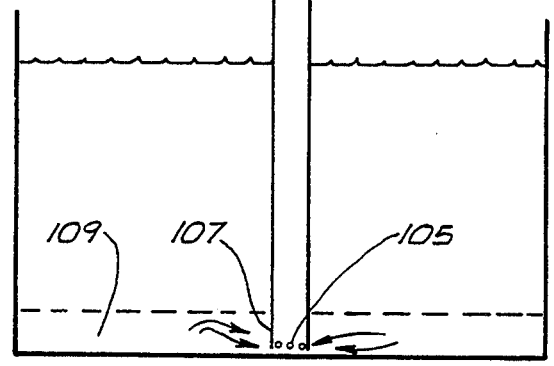
FIG. 3B illustrates an isolated view of the modified suction line utilized in the improved system of the present invention.
Figure 4:
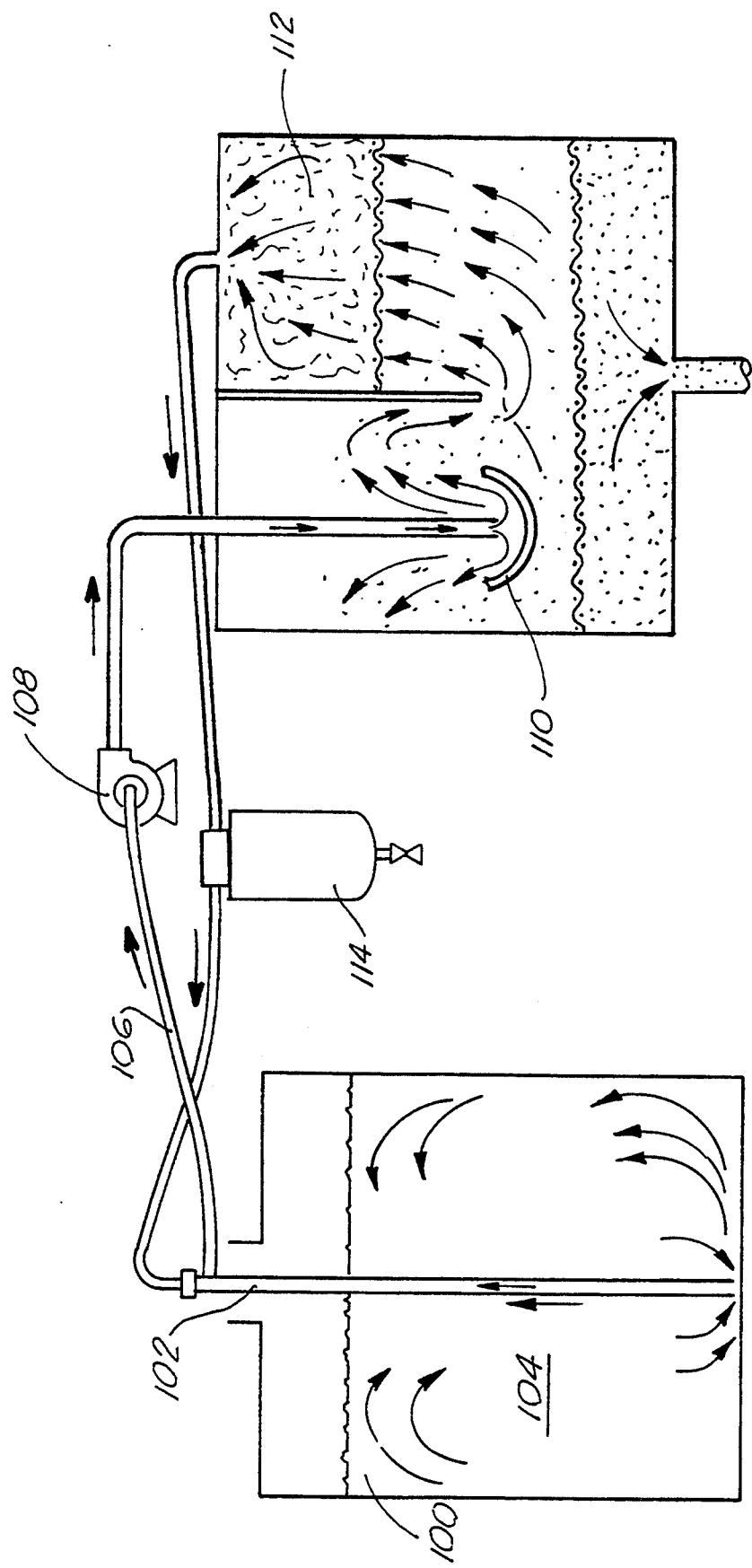
FIG. 4 in general the prior art system in filtering fuel from fuel tanks.

The improvements in the system are illustrated in FIGS. 1 through 3. As illustrated, there is provided, again, a fuel tank 100, containing contaminated fuel 104, where the contaminants may comprise heavy solids and free water. For purposes of illustration, the vessel 100 may be the same vessel disclosed in the above-referenced in FIGS. 1 and 3 of the above-referenced prior art patents to the same inventor. However, as illustrated in FIG. 3B, a first improvement concerns the modified suction line 103 initially introduced into the tank for suctioning off the fuel. The suction line would comprise a plurality of suction ports 105 located approximately ⅛ inch from the bottom end 107 of the suction pipe, so that in the event large quantities of free water 109 is encountered in the bottom of the tank, modified suction line 103 would suction off the water initially for immediate disposal. When the flow of fluid in the line begins to contain quantities of fuel, the modified suction line 103 is removed, and the suction/return line 102 as disclosed in FIG. 4 of the previous referenced patents by the same inventor is utilized. Therefore, the construction of modified suction line 103 assures retrieval of the heavier water at the bottom of the tank before the fuel is routed into the system for filtration.

Reference is now made to FIG. 1 which discloses the first embodiment of the improved filtration system. As illustrated, in this embodiment, the modified suction line 103 has completed the suctioning off of the free water, and has been removed. Principal suction/return line 102 is in place. As illustrated, the contaminated fuel is suctioned via line 102 by pump 120, and is routed from tank 100 via line 122. There is then provided a first raw water strainer means 124, which would strain off any remaining water and solid contaminants from the system, so as to avoid the pump 120 from being damaged or corroded by the free water or contaminants. As illustrated, a valve 125 positioned below the floor of strainer means 124 would allow controlled retrieval of the filtered materials into a collection vessel 126 for disposal. The strained fuel would then be pumped (a valve "F" is provided on the discharge side of the sump to take samples of the fuel being pumped to the primary separator and filtration means) into the filtration/separation vessel 110, as previously disclosed for the primary separation and filtration. The fuel would then be routed to tertiary filtration means 128, for filtration of the remaining contaminants of a size greater than 20 microns, or a selected size, and comprises a standard type of filter cartridge element found in the art. The decontaminated fuel would then be returned to fuel tank 100 via return line 102A positioned in the bore of line 102, as disclosed in the previous patents to this inventor.

FIG. 2 illustrates the second embodiment of the present invention. Again, as with the principal embodiment, the fuel is extracted from the fuel tank and routed directed to a filtration/separation vessel 150. This vessel, as previously stated, is of the type disclosed in FIG. 1 the inventors prior art patents. The fuel is circulated within the vessel, and the larger contaminants and free water settles at the bottom 152 of the vessel. The cleaner, lighter fuel is removed from the upper portion 154 of the vessel, and is routed, via line 156, to the tertiary filter 128, as previously discussed, and then returned to the tank 100. The contaminated portion of the fuel and free water settled to the bottom 152 of vessel 150 is decanted off, by opening valve 158, and is routed via line 160, to a first transparent vessel 162, where the contaminated fuel can be visually inspected for water and contaminant content. (There is also provided valve 158(a) at the bottom of vessel 150 which is used to drain vessel 150 for periodic cleaning between service jobs). There is provided a valve 164 at the bottom of vessel 162, for decanting off the contaminated fuel/free water from the vessel into a contaminant collection tank 166 for disposal. As the system is operated to remove contaminants from a tank 100, the quantity of contaminants removed from the bottom of the separator vessel 150 per unit volume of liquid drained into transparent vessel 162 becomes progressively less. These contaminants settle to the bottom of transparent vessel 162 above which in transparent vessel 162 is relatively clean fuel. The relatively clean fuel in the upper portion of transparent vessel 162 is removed by valve 168 and line 178 to the clean fuel collection tank 180 for reintroduction into the system by pouring into vessel 163 and opening valve 165 as shown in FIG. 1. Successive samples are collected in transparent vessel 162 with the sediments collecting and concentrating in the lower portion of transparent vessel 162 and the relatively clean fuel drained with valve 168 into container 180.

When substantial quantities of sediments are accumulated in the lower portion of transparent vessel 162 they are drained into the contaminant collection tank 166. This procedure concentrates the contaminants, minimizes the quantity of fuel with contaminants to be disposed, and minimizes the loss of fuel from tank 100 resulting from the fuel cleaning operation.

Similar to the procedure described above for removing and concentrating contaminants from the bottom of tank 150 using transparent vessel 162 and valves 164 and 168, there is provided a line 170 from the bottom of tertiary filter means 128 to valve 172 and a continuation of line 170 into transparent vessel 162 which are used to collect and concentrate contaminants from the bottom of tertiary filter means 128. These contaminants are concentrated using valve 164, the collection tank 166, valve 168, and clean fuel collection tank 180 in a manner similar to that described for collecting and concentrating contaminants from the bottom of tank 150 as described above.

There is also provided valve "E" which is at the bottom of tertiary filter 128 which is used to drain filter 128 prior to changing the filter element contained therein.

This embodiment also includes a second transparent vessel 182 which would receive samples of the fuel that has been filtered from the upper portion 154 of tank 150 after it exit tertiary filter means 128. This vessel is principally a quality control vessel which allow visual inspection of samples of the filtered fuel before it is routed via valve "B" and line 178 to clean fuel collection tank 180 where the clean fuel can be reintroduced into the system by pouring into vessel 163 and opening valve 165 as shown in FIG. 1.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. Glossary of terms:

filtration system 10
fuel tank 100
suction line 102
fuel 104
line 106
pump 108
first filtration/separator vessel 110
filtration medium 112
secondary filter 114
modified suction line 103
ports 105
bottom end 107
line 118
pump 120
line 122
raw water strainer means 124
valve 125
collection vessel 126
tertiary filtration means 128
filtration/separation vessel 150
bottom 152
upper portion 154
line 156
valve 158
line 160
first transparent vessel 162
vessel 163
valve 164
valve 165
collection tank 166
second valve 168
line 170
line 178
clean fuel collection tank 180
second transparent vessel 182

What is claimed as invention is:

1. A process for collecting and concentrating contaminants and free water from fuel contained in a tank, the system comprising:
   a) providing means for suctioning the fuel from the fuel tank;
   b) providing a primary filtration/separation vessel for receiving the suctioned fuel, and for separating the free water and contaminants into the bottom of the vessel, and the lighter cleaner fluid into the top portion of the vessel;
   c) filtering the cleaner fuel in the top portion of the vessel and transporting the cleaner fuel out of the primary filtration/separation vessel to a tertiary filter for return to the fuel tank;
   d) routing samples of the contaminated fuel and free water from the bottom of the filtration/separation vessel and bottom of the tertiary filter into a first transparent vessel for visually inspecting the fuel routed thereinto;
   e) draining relatively clean fuel from the upper portion of the transparent vessel into a clean fuel collection tank and concentrating the contaminants in the lower portion of the transparent vessel which become progressively more concentrated as subsequent samples of contaminated fuel are obtained from the bottom of the separator and the bottom of the tertiary filter;
   f) draining the concentrated contaminants from the lower portion of the transparent vessel into a container for disposal; and
   g) routing samples of the clean fuel from the tertiary filter into a clean fuel transparent container; and
   h) inspecting and comparing the clean fuel with samples in the transparent container used to collect dirty fuel contaminants, and water.

2. The process in claim 1, further comprising the step of providing a first modified suction line positioned extending downward in the fuel tank so that the lower end of the suction line suctions off the free water at the bottom of the tank through a plurality of ports positioned in the wall of and adjacent the end of the line.

* * * * *